United States Patent [19]
Kim

[11] Patent Number: 5,293,246
[45] Date of Patent: Mar. 8, 1994

[54] APPARATUS FOR REMOVING FOREIGN MATERIALS FROM THE HEAD OF A VIDEO

[75] Inventor: Hee M. Kim, Seoul, Rep. of Korea

[73] Assignee: Samsung Electronics Co., Ltd., Suwon, Rep. of Korea

[21] Appl. No.: 942,445

[22] Filed: Sep. 9, 1992

[30] Foreign Application Priority Data

Sep. 9, 1991 [KR] Rep. of Korea ............. 91-15879

[51] Int. Cl.$^5$ ............................................. H04N 9/79
[52] U.S. Cl. .................................... 358/310; 360/31; 360/75; 360/69
[58] Field of Search ............... 360/31, 69, 75, 78.12, 360/128, 137, 90, 55, 71; 358/310

[56] References Cited

U.S. PATENT DOCUMENTS

| | | | |
|---|---|---|---|
| 4,607,297 | 8/1986 | Sonoda et al. | 360/55 |
| 4,827,361 | 5/1989 | Yoshioka | 360/69 |
| 5,088,082 | 2/1992 | Yamada et al. | 369/71 |
| 5,130,866 | 7/1992 | Klaassen et al. | 360/25 |

FOREIGN PATENT DOCUMENTS 52-75426  6/1977  Japan.

Primary Examiner—Tommy P. Chin
Assistant Examiner—Robert Chevalier
Attorney, Agent, or Firm—Sughrue, Mion, Zinn, Macpeak & Seas

[57] ABSTRACT

An apparatus for removing foreign materials from the head of a video cassette recorder or a video camera wherein the foreign materials adhering to the head are repeatedly cleansed away by a head cleaner until the foreign materials are completely removed. A synchronizing signal detecting section 20 detects synchronizing signals from among video signals amplified by a video mechanism 10. The synchronizing signal detecting section 20 then converts the detected signals into a DC voltage. An envelope detecting section 30 detects envelope signals from among the video signals and converts them into a DC voltage. The output of the synchronizing signal detecting section 20 and that of the envelope detection section 30 are compared by a comparing section 40. A microcomputer 60 controls the head cleaner 12 in accordance with the output of the comparing section 40, thereby making it possible to completely clean the head with an apparatus that is convenient and easy to use.

6 Claims, 2 Drawing Sheets

| A | B | C | AN EXISTENCE OF FOREIGN MATERIALS | A POSITION OF HEAD CLEANER |
|---|---|---|---|---|
| H | H | H | REMOVED | HOLD A POSITION OF REGENERATION |
| L | H | H | REMOVED | HOLD A POSITION OF REGENERATION |
| H | L | H | REMOVED | HOLD A POSITION OF REGENERATION |
| L | L | L | REMAIN | MOVE TO A STOP POSITION |

APPARATUS FOR REMOVING FOREIGN MATERIALS FROM THE HEAD OF A VIDEO

FIELD OF THE INVENTION

The present invention relates to a head cleaner for removing foreign materials from the head of a video camera or video cassette recorder, and particularly to an apparatus for removing foreign materials from such a head, in which a determination is made regarding whether foreign material is adhering to the head, and in which a head cleaner is operated until such time as the foreign materials are completely removed from the head.

BACKGROUND OF THE INVENTION

A conventional head cleaning apparatus is generally activated by contacting a drum of a video cassette recorder or a video camera. Such a conventional head cleaner is activated only once and only for a certain period of time when the tape is either loaded or unloaded from the recorder or camera. Since such a conventional apparatus is activated only once during loading or unloading of the tape, the apparatus is ineffective in ensuring that foreign materials have been completely removed from the head. Whenever the foreign materials are not completely removed, however, the video picture becomes unstable, or no picture at all is displayed. As a result, the user may think that the video cassette recorder or video camera is out of order.

U.S. Pat. No. 4,970,617 discloses an alternative system in which dust and humidity adhering to the tape are cleaned while the tape is running and before the tape contacts the head. This technique, however, requires attaching a special mechanism for removing foreign materials, which is costly and burdensome.

SUMMARY OF THE INVENTION

A first object of the present invention is overcoming the above-described disadvantages of conventional head cleaning techniques.

Another object of the present invention is to provide an apparatus for removing foreign materials from the head of a video cassette recorder or video camera in which a head cleaner is operated continuously until the foreign materials have been completely removed from the head.

To achieve the above objects, the head cleaning apparatus of the present invention closely contacts a drum to clean the head during loading or unloading of the tape, and includes a synchronizing signal detecting section, connected to a video mechanism, for detecting synchronizing signals from among video signals amplified by a pre-amplifier of the video mechanism, and for converting the detected synchronizing signals into a DC voltage. It also includes an envelope detecting section, connected to the synchronizing signal detection section, for detecting envelope signals from among the video signals, and for converting the detected envelope signals into a DC voltage. The apparatus further includes a comparing section, connected to the synchronizing signal detecting section and to the envelope detecting section, for comparing the output of the synchronizing signal detecting section with that of the envelope detecting section in order to measure a state of removal of the foreign materials, and includes a microcomputer, connected to the comparing section, for controlling the head cleaner in accordance with the output of the comparing section.

BRIEF DESCRIPTION OF THE DRAWINGS

The above objects and other advantages of the present invention will become more apparent by the following detailed description of the preferred embodiments of the present invention with reference to the attached drawings in which.

DESCRIPTION OF THE PREFERRED EMBODIMENTS

Figure 1:
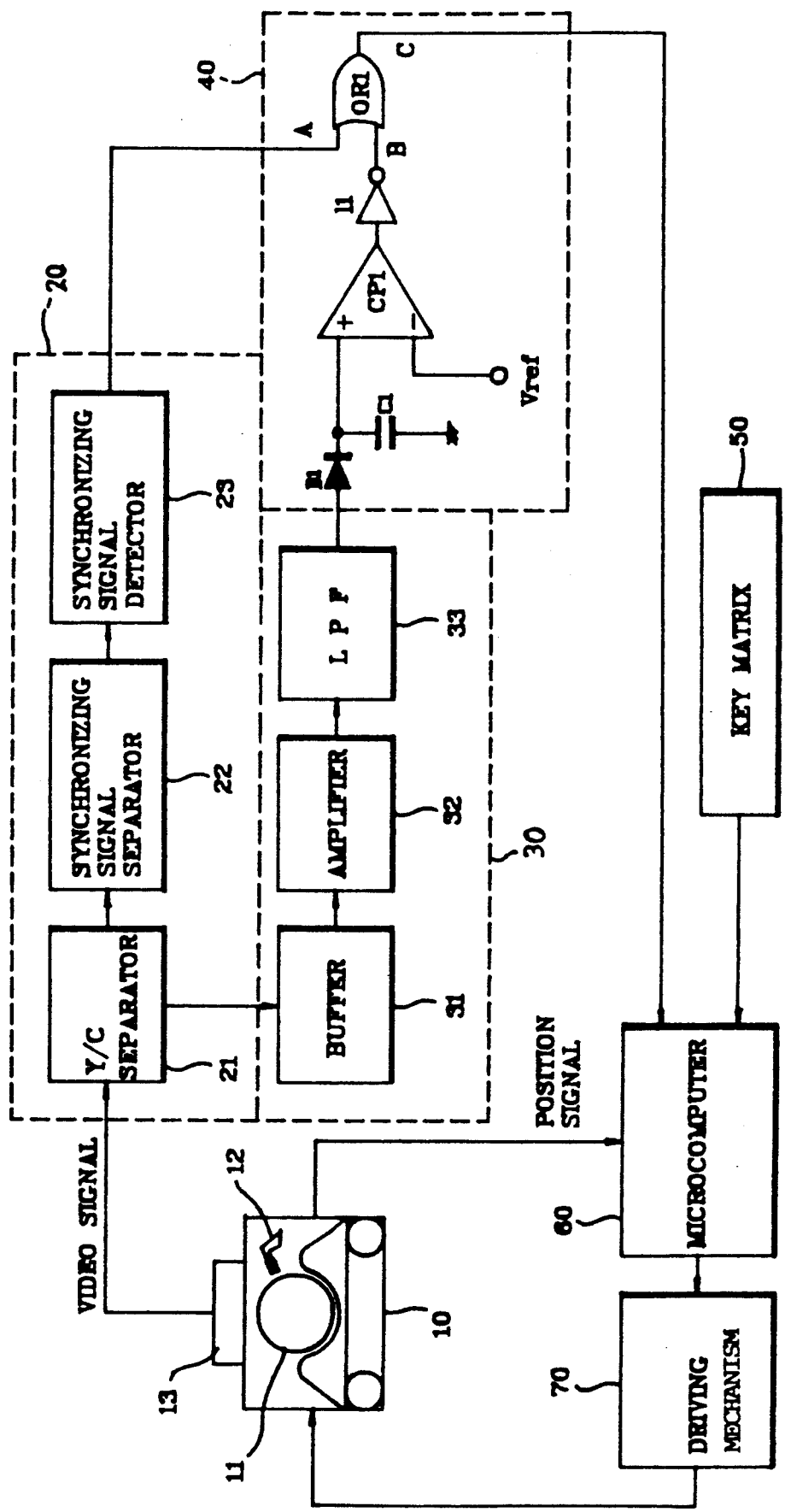
FIG. 1 is a block diagram of the head cleaning apparatus according to the present invention.

The present invention will now be described in detail, referring to the attached drawings.

The apparatus for removing foreign materials from the head of a video cassette recorder or a video camera includes a microcomputer 60 for providing control signals to a driving mechanism 70 after the receipt of key inputs from a key matrix 50 and after recognizing position signals of a video mechanism 10. The video mechanism 10 is driven by the output of the driving mechanism 70 and has a head cleaner 12 contacted to a drum 11. The apparatus also includes a synchronizing signal detecting section 20 connected to the video mechanism 10, which separates out synchronizing signals from video signals that are output from a pre-amplifier 13 of the video mechanism 10. The separated signals are then converted to a DC voltage. The apparatus further includes an envelope detecting section 30 connected to the synchronizing signal detecting section 20, for detecting envelope signals in the video signals. The detected signals are then also converted to a DC voltage. A comparing section 40 in the apparatus is connected to the synchronizing signal detecting section 20 and the envelope detecting section 30, and compares the output of the envelope detecting section 30 with that of the synchronizing signal detecting section 20. The comparison provides a measure of the extent to which foreign materials on the head have been removed. The microcomputer 60 controls the operation of the head cleaner 12 in accordance with the output of the comparing section 40.

The synchronizing signal detecting section 20 includes a Y/C separator 21 for separating the video signals into brightness signals and color signals, a synchronizing signal separator 22 for separating out synchronizing signals from the brightness signals of the Y/C separator 21, and a synchronizing signal detector 23 for flatting the detected synchronizing signals of the separator 22 into a DC voltage.

The envelope detecting section 30 includes a buffer 31 for buffering and amplifying the brightness signals separated by the Y/C separator 21, an amplifier 32 for amplifying the output of the buffer 31, and a low pass filter (LPF) 33 for passing only the low band portions of the output signals of the amplifier 32.

The comparing section 40 includes a diode D1 and a condenser C1 for rectifying and flattening the output of the low pass filter 33, a comparator CP1 for comparing the resulting flattened voltage with a reference voltage Vref, an inverter I1 for inverting the output of the comparator CP1, and an OR gate OR1 for logic-summing the output of the inverter I1 and that of the synchronizing signal detecting part 20.

The apparatus of the present invention constituted as described above will now be described as to its operation and effect.

First, the head cleaner 12, which is installed near the drum 11 of the video mechanism 10, removes foreign materials from the head by being closely attached to the drum 11 in accordance with control signals from the microcomputer 60. The control signals are supplied through the driving mechanism 70 during loading or unloading of the video tape.

After this operation is carried out once during the loading or unloading process, the operation is terminated regardless of whether foreign materials are completely removed from the head or not. While the head cleaner 12 contracts the drum 11, the apparatus is in a so-called stop-position.

Thus, during a loading operation, the stop position occurs only once after loading the cassette. Subsequently, the apparatus shifts to a regenerating position. Then, in an unloading operation, the cassette is unloaded after the apparatus passes a stop position from a regenerating position. Thus, the head cleaner 12 removes foreign materials from the head under the control of the microcomputer 60 after the microcomputer receives a position signal from the video mechanism 10 at the stop position.

In the conventional method described earlier, in which the head cleaner 12 is driven only once at the stop position in order to remove foreign materials during loading or unloading of the cassette, there is no confirmation as to whether the foreign materials are completely removed from the head. Therefore, the head cleaner terminates the cleaning mode without completely removing the foreign materials.

In order to overcome this problem, the present invention provides an apparatus that drives the head cleaner 12 only once during an unloading operation, yet drives the head cleaner 12 repeatedly until foreign materials are completely removed during a loading operation. Preferably, the present invention also retains the option of operating according to the conventional cleaning method.

During a loading operation, the head cleaner 12 is driven once at the stop position, and then the video signals are checked at a regenerating position. If it is found that foreign materials are not completely removed, the operation is returned to the stop position to drive the head cleaner 12 again, and then the operation is again advanced to a regenerating position. Regenerating operations are carried out following every stop position and then again after the foreign materials are completely cleaned from the head.

Such operations are performed as a result of inputting a specified instruction via the inputting keys of the key matrix 50, and, if the selecting key is turned off, cleaning is performed in the conventional manner. If, instead, the selecting key is turned on, the automatic repeat cleaning feature is implemented.

Now the operation for completely removing the foreign materials in an automatic manner upon loading a cassette will be described in detail.

First, the selecting key of the key matrix 50 is turned on. Once a cassette is loaded, the microcomputer 60 activates the video mechanism 10 via the driving mechanism 70 so that a loading operation may be carried out. The microcomputer 60 recognizes the position signal which is supplied from the video mechanism 10 in order to drive the head cleaner 12 to contact the drum 11 for the purpose of removing foreign materials from the head.

When the loading operation proceeds and arrives at a regenerating position, the video signals picked up by the head are amplified by the pre-amplifier 13, before being supplied to the synchronizing signal detecting section 20. The synchronizing signal separator 22 of the synchronizing signal detection section 20 selects the synchronizing signals from among the brightness signals separated by the Y/C separator 21 from the video signals. Then the selected signals are supplied to the synchronizing signal detector 23, which converts the signals to a DC voltage. If normal synchronizing signals are detected, the detector 23 outputs a high level signal. If no synchronizing signals are detected, the detector 23 outputs a low level signal.

Here, the detection of synchronizing signals means that foreign materials have been completely removed from the head, and video signals can be picked up in the normal manner. On the other hand, the nondetection of synchronizing signals means that foreign materials have not been completely removed, and clear video signals cannot be picked up.

Meanwhile, the regeneration envelope signals separated by the Y/C separator 21 are buffered and amplified by the buffer 31, and amplified again by the amplifier 32. Then the amplified signals pass to the low pass filter 33. The envelope signals output from the low pass filter 33 are rectified and flattened by the diode D1 and the condenser C1.

The envelope signals which are rectified and flattened by the diode D1 and the condenser C1 after being detected by the envelope detecting section 30 are supplied to the comparator CP1, where the signals are compared with the reference voltage Vref.

The level of the reference voltage Vref is set to be slightly lower than the rectified and flattened voltage which is obtained when signals obtained from a head having no foreign material attached thereto are passed through the envelope detecting part 30, the diode D1 and the condenser C1.

Therefore, when no foreign materials adhere to the head, the voltage which has passed through the envelope detecting section 30, the diode D1 and the condenser C1 is slightly higher than the reference voltage Vref, with the result that the comparator CP1 outputs a high level signal. On the other hand, if foreign materials continue to cling to the head, the voltage which has passed through envelope detecting section 30, the diode D1 and the condenser C1 is lower than the reference voltage Vref, with the result that the comparator CP1 outputs a low level signal.

The output of the comparator CP1 is inverted by the inverter I1, and is logic-summed together with the output of the synchronizing signal detecting section 20 by the OR gate OR1 before being supplied to the microcomputer 60.

Figures 2, 3:
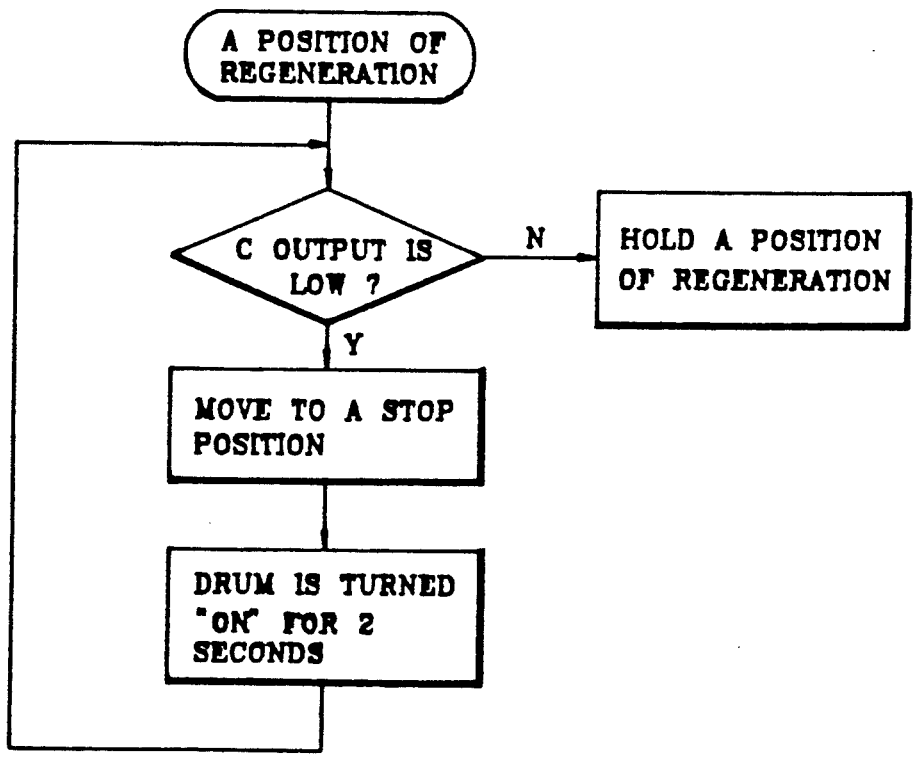
FIG. 2 illustrates the various inputs and outputs of the comparing section of FIG. 1.
FIG. 3 is a flowchart showing the operation of the microcomputer according to the present invention.

A table of the various outputs of the comparing section 40 is shown in FIG. 2. As can be seen in FIG. 2, it is determined that foreign materials remain on the head only when synchronizing signals are not detected (A=low) and a low level for the envelope signal is output by the inverter I1 (B=low). On the other hand, it is determined that foreign materials have been removed completely from the head when (i) synchronizing signals are detected (A=high), or (ii) synchronizing signals are not detected (A=low) and a high level for the envelope signals is output by the inverter I1 (B=high).

If the existence of foreign materials were determined only based on the existence or absence of synchronizing signals, presence of foreign materials on the head would be erroneously established in cases where synchronizing signals are absent because of damage to the video tape. Thus the foreign material adhering state is accurately determined without any error.

When the output of the comparing section 40 is supplied to the microcomputer 60, the microcomputer 60 carries out the operations of the flow chart shown in FIG. 3.

That is, if a high level signal is supplied from the comparing section 40, the microcomputer 60 holds the video mechanism 10 in a regenerating position by means of the driving mechanism 70. On the other hand, if a low level signal is supplied, the microcomputer 60 determines that there are foreign materials attached to the head, and signals the driving mechanism 70 to move the video mechanism 10 to a stop position. It then turns the drum 11 "on" so as to remove the foreign materials.

At this time, if a high level signal is supplied from the comparing section 40, the video mechanism 10 is held at a regenerating position. If, instead, a low level output is supplied, the drum 11 is turned on, so that the head may again be cleaned by the head cleaner 12, whereupon the routine of judging the output of the comparing section 40 is repeatedly carried out until the head is completely cleaned off.

According to the present invention as described above, the head is cleaned in such a manner that the extent to which foreign material adheres to the head is repeatedly measured, and cleaning is carried out until no foreign material remains. Thus, the apparatus performs a complete cleaning of the head, and therefore, the user can enjoy "clean" pictures, and also can benefit from the convenience which the apparatus provides.

What is claimed is:

1. An apparatus for removing foreign materials from a head of a video apparatus by closely contacting a head cleaner to a drum, which forms part of a video mechanism in the video apparatus, during loading or unloading of a video tape, comprising:

a synchronizing signal detecting section connected to the video mechanism, for detecting synchronizing signals from among video signals amplified by a pre-amplifier of the video mechanism, and for converting the detected synchronizing signals into a DC voltage output;

an envelope detecting section connected to said synchronizing signal detecting section, for detecting envelope signals from among the video signals, and for converting the detected envelope signals into a DC voltage output;

a comparing section connected to said synchronizing signal detecting section and said envelope detecting section, for comparing the output of said synchronizing signal detecting section with the output of said envelope detection section in order to measure a state of removal of the foreign materials; and a microcomputer connected to said comparing section, for controlling said head cleaner in accordance with an output of said comparing section.

2. An apparatus for removing foreign materials, as claimed in claim 1, wherein said comparing section comprises:

a diode and a condenser for rectifying and flattening the output of said envelope detecting section to provide a flattened voltage;

a comparator for comparing the flattened voltage of said diode and said condenser with a reference voltage to provide an output; and a logic gate for logic-summing the output of said comparator and the output of said synchronizing signal detecting section in order to supply a logic-summed output to said microcomputer.

3. An apparatus for removing foreign materials, as claimed in claim 2, wherein said logic gate is an OR gate.

4. An apparatus for removing foreign materials, as claimed in claim 1, wherein said synchronizing signal detecting section comprises a Y/C separator for separating the video signals into brightness signals and color signals, a synchronizing signal separator for separating synchronizing signals from the brightness signals, and a synchronizing signal detector for flattening the separated synchronizing signals into a DC voltage.

5. An apparatus for removing foreign materials, as claimed in claim 1, wherein said synchronizing signal detecting section includes a Y/C separator for separating the video signals into brightness signals and color signals, and wherein said envelope detecting section comprises a buffer for buffering and amplifying the brightness signals to provide an output, an amplifier for amplifying the output of said buffer to provide output signals, and a low pass filter for passing low-band portions of the output signals of said amplifier.

6. An apparatus for removing foreign materials, as claimed in claim 2, wherein said comparing section further comprises:

an inverter for inverting the output of said comparator to provide an inverted output, and supplying the inverted output to said logic gate.

* * * * *